US 11,136,252 B2

(12) United States Patent
Wu

(10) Patent No.: US 11,136,252 B2
(45) Date of Patent: Oct. 5, 2021

(54) HORIZONTAL SELF-BALANCING SUPERCRITICAL REACTION APPARATUS

(71) Applicant: Nanjing Since-More Environmental Technology Co, Ltd., Province Jiangsu (CN)

(72) Inventor: Dandan Wu, Province Jiangsu (CN)

(73) Assignee: Nanjing Since-More Environmental Technology Co, Ltd., Nanjing (CN)

( * ) Notice: Subject to any disclaimer, the term of this patent is extended or adjusted under 35 U.S.C. 154(b) by 177 days.

(21) Appl. No.: 16/469,824

(22) PCT Filed: Nov. 20, 2018

(86) PCT No.: PCT/CN2018/116500
§ 371 (c)(1),
(2) Date: Jun. 14, 2019

(87) PCT Pub. No.: WO2019/076385
PCT Pub. Date: Apr. 25, 2019

(65) Prior Publication Data
US 2020/0087180 A1    Mar. 19, 2020

(30) Foreign Application Priority Data

Oct. 20, 2017   (CN) .......................... 201710983598.4

(51) Int. Cl.
*C02F 1/74* (2006.01)
*B01J 3/00* (2006.01)
(Continued)

(52) U.S. Cl.
CPC ................ *C02F 1/74* (2013.01); *B01J 3/008* (2013.01); *C02F 1/02* (2013.01); *C02F 2101/30* (2013.01); *C02F 2301/066* (2013.01)

(58) Field of Classification Search
CPC .......... C02F 1/74; C02F 1/02; C02F 2101/30; C02F 2301/066; C02F 11/086;
(Continued)

(56) References Cited

U.S. PATENT DOCUMENTS 3,920,548 A * 11/1975 Fassell .................... C02F 11/08
210/761
5,053,142 A * 10/1991 Sorensen .................. B09C 1/08
210/742

FOREIGN PATENT DOCUMENTS

CN    101570375 A    11/2009
CN    102730917 A    10/2012
(Continued)

OTHER PUBLICATIONS

Machine-generated English translation of CN 102992466 A, generated on Feb. 5, 2021.*

*Primary Examiner* — Fred Prince
(74) *Attorney, Agent, or Firm* — PROI Intellectual Property US; Klaus Michael Schmid

(57) ABSTRACT

A horizontal self-balancing supercritical reaction apparatus, comprising a pressure vessel, a high pressure air compression apparatus, and at least one reactor arranged within the pressure vessel. The reactor is internally provided with front and rear pistons, two ends of the reactor are sealed by the reactor front piston and the reactor rear piston, a pressure medium is filled between the reactor front piston and an inner wall of the pressure vessel, the reactor rear piston is connected to a rear piston driving motor by a rear piston push rod, the reactor is provided with a water inlet and a water/air outlet which are controlled by valves, the reactor is internally provided with a heating apparatus, and the high pressure air compression apparatus is connected to the inside of the reactor. The present invention utilises a pressure (Continued)

self-balancing system, which significantly improves the stress characteristics of the reactor.

11 Claims, 1 Drawing Sheet

(51) Int. Cl.
*C02F 1/02* (2006.01)
*C02F 101/30* (2006.01)

(58) Field of Classification Search
CPC .................. C02F 2303/10; B01J 3/008; B01J 2219/00031; B01J 19/002; Y02W 10/30; Y02P 20/54
USPC ................................................. 210/205, 761
See application file for complete search history.

(56) References Cited

FOREIGN PATENT DOCUMENTS

| | | |
|---|---|---|
| CN | 102992466 A | 3/2013 |
| CN | 104291546 A | 1/2015 |
| CN | 107698012 A | 2/2018 |
| CN | 207468270 U | 6/2018 |
| EP | 0689868 A1 | 1/1996 |
| JP | 1190495 A | 4/1999 |

* cited by examiner

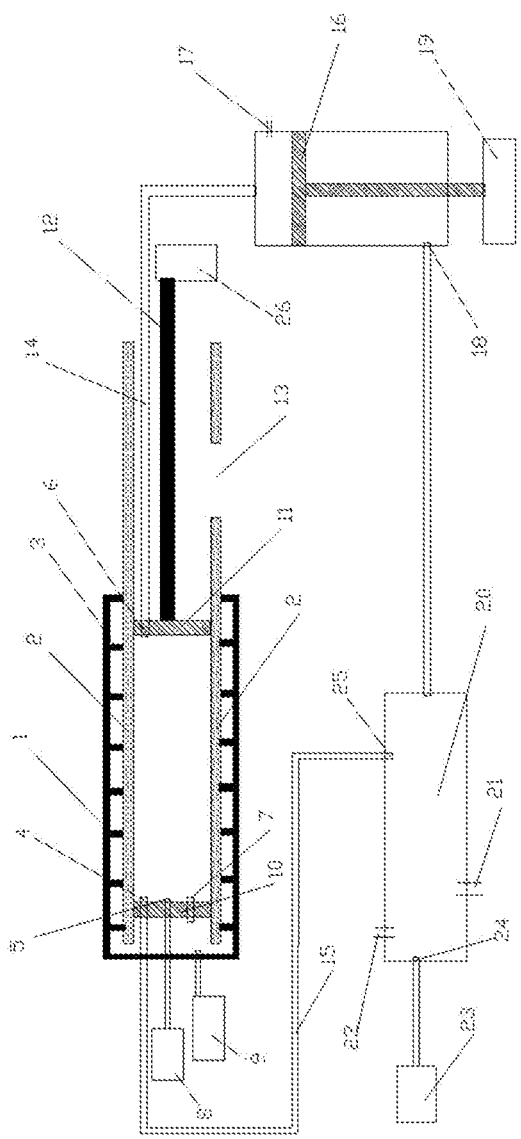

HORIZONTAL SELF-BALANCING SUPERCRITICAL REACTION APPARATUS

TECHNICAL FIELD

The present invention relates to the field of environmental protection technologies, and more especially, to a horizontal self-balancing supercritical reaction apparatus.

BACKGROUND ART

With the development of China's economy, industries such as chemicals, leather, food, pharmaceuticals and papermaking are developing at a high speed. However, enterprises in these industries produce a large volume of high-concentration organic wastewater, and many problems in the prior art like long treatment cycle, high treatment cost, large land coverage area of equipment, and poor effect and low efficiency and secondary pollution often accompanied in treatment bring a host of troubles to enterprises and restrict the development of these industries.

High-concentration organic wastewater refers to wastewater with a COD above 2000 mg/L. Part of industrial wastewater has a COD of tens of thousands or even hundreds of thousands mg/L, while having a relatively low BOD. The ratio of BOD to COD in much wastewater is less than 0.3, and such wastewater often contains a certain acidic or alkaline or toxic substances, which make these conventional processes, such as biological method, difficult to achieve a desirable treatment effect.

For high-concentration organic wastewater, the main treatment methods used currently are oxidation-adsorption, incineration, adsorption, and SBR treatment. These treatment methods may have problems such as low treatment efficiency, high treatment cost, incomplete treatment, and secondary pollution in treatment process, which cause great troubles to related enterprises in treatment and discharge of wastewater.

SUMMARY

The objective of the present invention is to provide a high-efficiency horizontal self-balancing supercritical reaction apparatus for rapid, efficient and low-cost treatment of high-concentration bio-refractory organic wastewater and contaminated soil.

To achieve the objective above, the present invention adopts the following technical solution:
a horizontal self-balancing supercritical reaction apparatus is provided, wherein the apparatus comprises a pressure vessel, a high-pressure air compression unit and at least one reactor provided in the pressure vessel;
a front piston and a rear piston are provided inside the reactor, two ends of the reactor are closed by the front piston of the reactor and the rear piston of the reactor, respectively; a pressure medium is filled between the front piston of the reactor and the inner wall of the pressure vessel; the rear piston of the reactor is connected with a rear piston driving motor through a rear piston push rod; a valve-controlled water inlet and a water/gas outlet are provided in the reactor, and a heating unit is provided inside the reactor;
the high-pressure air compression unit communicates with the interior of the reactor.

In the present invention, a balance between the pressure in the built-in reactor and the pressure in the pressure vessel is automatically achieved by the communication between the pressure vessel and the piston system provided in the reactor, so that all parts of the reactor are under a uniform pressure to ensure the safety of the built-in reactor. The high-pressure air compression unit can introduce compressed air to the reactor so that oxygen in the air is used as an oxidant to treat pollutants. The pressure in the reactor rises as high-pressure air is introduced, and the pressure of the pressure medium in the pressure vessel also rises due to the action of pressure conduction. Finally, the pressure in the built-in reactor is the same as that of the pressure medium in the pressure vessel. When sufficient compressed air is introduced, the high-pressure air compression unit is closed and the heating unit is opened, so that the pressure and temperature in the reactor continue to rise until supercritical reaction conditions are reached. When the reaction is completed, a pressure reducing valve of the water/gas outlet valve is opened, and reaction products are discharged under the action of a high pressure in the reactor. During this process, the pressure of the reactor is continuously decreasing, and the pressure of the pressure medium in the pressure vessel is also decreasing. The reaction products discharged through the water/gas outlet pipe may be condensed using a conventional procedure.

In addition, the pressure vessel in the present invention is a conventional pressure vessel, and there is no special requirement for its material, provided that the design specification of the pressure vessel is met. A plurality of reactors may be provided in the pressure vessel, thereby achieving high-efficient use of the space of the pressure vessel, and also avoiding a difficulty in forming a large built-in ceramic reactor and a high fabrication cost; hydraulic oil may be selected as the pressure medium in the pressure vessel.

As a further improvement of the present invention, the apparatus further comprises a pressure reducing buffer unit, wherein the pressure reducing buffer unit comprises a piston, a cylinder, a piston push rod and a piston control motor; the cylinder is provided with a water inlet of the pressure reducing buffer unit, a water outlet of the pressure reducing buffer unit and a control valve of the pressure reducing buffer unit; the water inlet of the pressure reducing buffer unit is connected to the water/gas outlet of the reactor, and the water outlet of the pressure reducing buffer unit is connected to a wastewater tank to be treated; the piston control motor controls the piston push rod to push the piston to move and control the pressure in the cylinder, and the pressure reducing and discharge are controlled by opening/closing a control valve of the pressure reducing buffer unit. When the pressure reducing buffer unit is mounted, high temperature and high pressure gas/liquid in the reactor enters the pressure reducing buffer unit through the valve-controlled water/gas outlet of the reactor, and the water outlet of the pressure reducing buffer unit may be connected to a conventional condensation apparatus.

As a further improvement of the present invention, the apparatus further comprises a condensation and heat recovery unit and a preheating unit, wherein the condensation and heat recovery unit is connected to or integrated with the preheating unit, the condensation and heat recovery unit is connected to the water/gas outlet of the reactor or the water outlet of the pressure reducing buffer unit, and the preheating unit is connected to a wastewater tank to be treated and the water inlet of the reactor. The high temperature and high-pressure gas/liquid in the reactor enters the condensation and heat recovery unit through the water/gas outlet of the reactor for condensation, while the condensation and heat recovery unit recovers the heat released in condensation and transfers the heat to the preheating unit. The wastewater in the wastewater tank enters the preheating unit, and enters the reactor for reaction through the water inlet of the reactor after being preheated by the recovered heat. The condensation and heat recovery unit and the preheating unit may be integrated so as to be more conducive to heat exchange.

As a further improvement of the present invention, the apparatus further comprises a hydraulic control system, wherein the hydraulic control system pressurizes the pressure vessel to control the movement of the front piston of the reactor, and a residue outlet is provided in the reactor and located within the movement range of the rear piston of the reactor. The residue outlet, which is provided to periodically remove inorganic salt precipitates from the reactor to ensure efficient operation of the equipment, is located within the movement range of the rear piston of the reactor. The hydraulic control system pressurizes the pressure vessel to control the movement of the front piston of the reactor, so that the precipitates can be discharged from the residue outlet.

The present invention can be used for a supercritical oxidation treatment of high-concentration bio-refractory contaminated organic soil, wherein an appropriate amount of water is introduced into the contaminated soil to obtain mud which is then pumped into a built-in reactor through a mud pump, and compressed air is introduced into the built-in reactor through the high-pressure air compression unit, so that pollutants are treated by oxygen in the air as an oxidant. The reaction process is the same as the description above. When the reaction is completed, the pressure reducing valve of the water/gas outlet valve is opened to discharge the gas produced in the reaction under the action of the high pressure in the built-in reactor, and reaction residues are brought to and discharged from the residue outlet under the movement of the piston structure. The piston is reset by the movement of the piston system for next reaction.

As a further improvement of the present invention, an electromagnetic heating unit is selected as the heating unit, wherein the electromagnetic heating unit is placed in the front piston and the rear piston of the reactor. The heating unit is placed inside the piston system of the reactor and does not contact supercritical water to avoid a problem of corrosion of a heating circuit.

As a further improvement of the present invention, both the valve at the water/gas outlet of the reactor and the structure of the main body of the water/gas outlet pipe are made of ceramic. A ceramic structure can prevent the valve and the pipe from suffering corrosion and failure caused by long-term contact with supercritical water.

As a further improvement of the present invention, a pressure temperature sensor is further provided in the reactor, wherein the pressure temperature sensor is a ceramic sealed pressure temperature sensor. The pressure temperature sensor provided in the reactor can obtain the pressure temperature inside the reactor from time to time, and the ceramic sealed pressure temperature sensor can avoid damages due to corrosion by supercritical water.

As a further improvement of the present invention, the main body of the reactor is made of ceramic, spraying-coating ceramic or ceramic-metal composite. The ceramic material is preferably nanoceramic. The apparatus structure of the present invention makes the reactor always in a self-balanced state of internal and external pressure under different working conditions, and gives the reactor a good stress characteristic, thereby avoiding possible bursting of ceramic under a high internal pressure. As for the structure using a metal material with a ceramic coating, the two materials with different deformation and thermal expansion characteristics deform unevenly at a high temperature and a high pressure, which will causes the coating to break and fall off and further causes the corrosion protection of the structure to be destroyed. The structure of the present invention makes the application of a ceramic material possible and avoids many problems brought by the structural form of a metal material with a ceramic coating.

As a further improvement of the present invention, the reactor has a symmetrical cross section, and preferably has a circular cross section. A reactor with a circular cross section can reduce the difficulty in the forming of ceramic materials, and the equipment is simple to produce and low in cost.

As a further improvement of the present invention, a layer for protection, fixation and heat insulation is provided over the reactor, wherein the material of the layer for protection, fixation and heat insulation is a rubber material or an aerosol material.

As a further improvement of the present invention, the reactor is a split unitary structure or a combined integral structure.

The apparatus of the present invention uses a pressure self-balancing system, which greatly improves the stress characteristics of the built-in reactor, thereby making it possible to use a non-metallic material for a built-in reactor, overcoming a corrosion problem of the reactors of existing supercritical reaction apparatuses reactor and greatly reducing equipment costs. The equipment can be widely applied to the treatment of high-concentration bio-refractory wastewater produced in the course of production in industries like chemicals, leather, food and pharmaceuticals.

BRIEF DESCRIPTION OF THE DRAWING

FIG. 1 is a structural diagram of the apparatus in the present invention; where: 1. pressure vessel, 2. reactor, 3. layer for protection, fixation and heat insulation, 4. electromagnetic control valve of water inlet, 5. high pressure gas valve, 6. electromagnetic control valve of water/gas outlet, 7. pressure temperature sensor, 8. high-pressure air compression unit, 9. hydraulic control system, 10. front piston of reactor, 11. rear piston of reactor, 12. push rod of rear piston of reactor, 13. residue outlet, 14. water/gas outlet pipe, 15. water inlet pipe, 16. piston of pressure reducing buffer unit, 17. control valve of pressure reducing buffer unit, 18. water/gas outlet of pressure reducing buffer unit, 19. piston control motor of pressure reducing buffer unit, 20. unit integrating condensation, heat recovery and preheating, 21. water outlet vent of condensation and heat recovery unit, 22. gas outlet vent of condensation and heat recovery unit, 23. wastewater tank to be treated, 24. water inlet vent of preheating unit, 25. water outlet vent of preheating unit, 26. driving motor of rear piston of reactor.

DETAILED DESCRIPTION

The technical solution of the present invention is further described through the embodiments in combination with the drawings as below.

Embodiment 1

The apparatus, as shown in FIG. 1, comprises a pressure vessel 1, at least one reactor 2 provided in the pressure vessel, and a high-pressure air compression unit 8; wherein a pressure medium is filled between the front piston 10 of the reactor and the inner wall of the pressure vessel 1; in this embodiment, hydraulic oil is selected the pressure medium;

a water inlet controlled by an electromagnetic control valve 4 of the water inlet and a water/gas outlet controlled by an electromagnetic control valve 6 of the water/gas outlet are provided in the reactor 2, a heating unit is provided inside the reactor 2; both ends of the reactor 2 are sealed by a front piston 10 and a rear piston 11 of the reactor; the rear piston 11 of the reactor is connected to the driving motor 26 of the rear piston through a push rod 12 of the rear piston; and the high-pressure air compression unit 8 communicates with the interior of the reactor 2.

In this embodiment, an electromagnetic heating unit is selected as the heating unit, wherein the electromagnetic heating unit is placed in the front piston 10 and the rear pistons 11 of the reactor.

In this embodiment, a ceramic sealed pressure temperature sensor 7 is further provided in the reactor 2.

The main body of the reactor 2 is made of ceramic, spraying-coating ceramic or ceramic-metal composite; the reactor 2 has a symmetrical cross section; both the valve at the water/gas outlet of the reactor 2 and the structure of the main body of the water/gas outlet pipe are made of ceramic; the pressure temperature sensor 7 is a ceramic sealed pressure temperature sensor 7.

Embodiment 2

This embodiment differs from Embodiment 1 only in that: it further comprises a pressure reducing buffer unit, wherein the pressure reducing buffer unit comprises a piston 16, a cylinder, a piston push rod and a piston control motor 19, the cylinder is provided with a water inlet of the pressure reducing buffer unit, a water/gas outlet 18 of the pressure reducing buffer unit and a control valve 17, the water/gas inlet of the pressure reducing buffer unit is connected to the water/gas outlet of the reactor, and the water/gas outlet 18 of the pressure reducing buffer unit can be connected to a conventional condensation apparatus or the integral unit 20 in the present invention, which will be described in details in Embodiment 3; the control motor 19 of the piston controls the piston push rod to push the piston 16 to move and control the pressure in the cylinder.

Embodiment 3

This embodiment differs from the foregoing embodiments only in that: it further comprises a condensation and heat recovery unit and a preheating unit. In this embodiment, the condensation and heat recovery unit and the preheating unit are integrated into one integral unit 20; the integral structure is more conducive to heat exchange between the condensation and heat recovery unit and the preheating unit so as to reduce heat losses. The condensation and heat recovery unit is connected to the water/gas outlet of the reactor 2 or the water outlet of the pressure reducing buffer unit, and the preheating unit is connected to a wastewater tank 23 to be treated and the water inlet of the reactor 2.

In this embodiment, high temperature and high-pressure gas/liquid in the reactor 2 enters the condensation and heat recovery unit of the integral unit 20 through the water/gas outlet of the reactor 2 or the pressure reducing buffer unit for condensation, while the condensation and heat recovery unit recovers the heat released in condensation and transfers the heat to the preheating unit. The wastewater in the wastewater tank 23 enters the preheating unit, and after preheated by the recovered heat, enters the reactor 2 for reaction through the water inlet of the reactor 2. Gases, such as carbon dioxide, obtained in the reaction are discharged through a gas outlet vent 22.

Embodiment 4

This embodiment differs from the foregoing embodiments only in that: it further comprises a hydraulic control system 9, wherein the hydraulic control system 9 pressurizes the pressure vessel 2 to control the movement of the front piston 10 of the reactor. In this embodiment, hydraulic oil is introduced to the pressure vessel through the hydraulic pressure control system 9 to control the movement of the front piston 10 of the reactor; a residue outlet 13 is provided in the reactor 2 and located within the movement range of the rear piston 11 of the reactor.

The apparatus in the embodiment can be used for removing inorganic salt precipitates from the reactor, and repairing and replacing internal equipment. The specific process is as follows:

the electromagnetic control valve 6 of the water/gas outlet is opened, the electromagnetic control valve 4 of the water inlet and a high pressure gas valve 5 are closed, and the push rod 12 of the rear piston of the reactor is driven by the driving motor 26 of the rear piston of the reactor, so that the rear piston 11 of the reactor is pushed to the residue outlet 13 until it is moved to the right side of the residue outlet 13, while hydraulic oil is introduced to the pressure vessel through the hydraulic control system 9, so that the front piston 10 of the reactor is pushed to the residue outlet 13 until it is moved to the left side of the residue outlet 13. Inorganic salts precipitated in the interior of the reactor 2 are brought to and discharged from the residue outlet 13 under the movement of the piston system. Meanwhile, the piston system in the reactor 2 can be cleaned and the equipment can be replaced and repaired.

Embodiment 5

This embodiment differs from the foregoing embodiments only in that: a layer for protection, fixation and heat insulation 3 is further provided over the reactor 2, wherein the layer for protection, fixation and heat insulation 3 is made of rubber or aerosol.

Embodiment 6

The present invention may select a structure and an operation method for the apparatus as needed.

In this embodiment, taking the apparatus in Embodiment 3 as an example, the present invention provides a method of operating an apparatus for treating high-concentration bio-refractory organic wastewater, which is specifically described as follows:

Operation Scheme 1: Treatment of High-Concentration Bio-Refractory Organic Wastewater.

Step 1, the control valve 17 of the pressure reducing buffer unit is opened, the piston 16 of the pressure reducing buffer unit is driven by the piston control motor 19 of the pressure reducing buffer unit to move upward to the top, the control valve 17 of the pressure reducing buffer unit is closed, the electromagnetic control valve 6 of the water/gas outlet is closed, the electromagnetic control valve 4 of the water inlet is opened, and wastewater to be treated is introduced to the reactor 2 through a feed pump.

Step 2, when the feeding is completed, the electromagnetic control valve 4 of the water inlet is closed, the high pressure gas valve 5 is opened, and compressed air is introduced to the reactor 2 through the high-pressure air compression unit 8. When the air introduced to the reactor 2 reaches a designed amount, the high pressure gas valve 5 is closed, and the electromagnetic heating units provided in the front piston 10 and the rear piston 11 of the built-in reactor is opened to heat the liquid to be treated and the gas in the reactor 2 so as to achieve a supercritical reaction state.

Step 3, when the reaction is completed, the electromagnetic control valve 6 of the water/gas outlet is opened, so that reaction products enter the pressure reducing buffer unit through the water/gas outlet pipe 14 and high temperature and high pressure gas/liquid pushes the piston 16 of the pressure reducing buffer unit downward to the bottom. Decompressed gases enter the unit integrating condensation, heat recovery and preheating 20 through the water/gas outlet 18 of the pressure reducing unit. After condensation, water is discharged through the condensation and heat recovery unit 21, and gases obtained by the reaction, such as carbon dioxide, are discharged through the gas outlet vent 22 of the condensation and heat recovery unit. During this process, the wastewater in the wastewater tank 23 to be treated which enters the tank through the preheating unit 24 is preheated by the heat of the high temperature gas through the unit integrating condensation, heat recovery and preheating 20. Preheated wastewater enters the water inlet pipe 15 through the preheating unit 25 of the high-efficiency condensation and heat recovery system for a next reaction. The rear piston 11 of the reactor is always locked in the whole process.

Embodiment 7

In this embodiment, taking the apparatus in Embodiment 4 as an example, the present invention provides a method of operating an apparatus for treating high concentration bio-refractory organic contaminated soil, which is specifically described as follows:

Step 1, the control valve 17 of the pressure reducing buffer unit is opened, the piston 16 of the pressure reducing buffer unit is driven by the piston control motor 19 of the pressure reducing buffer unit to move upward to the top, the control valve 17 of the pressure reducing buffer unit is closed, the electromagnetic control valve 6 of the water/gas outlet is closed, the electromagnetic control valve 4 of the water inlet is opened, and an appropriate amount of water is introduced into contaminated soil to be treated to prepare mud which is then introduced into the reactor 2 through a mud pump.

Step 2, when feeding is completed, the electromagnetic control valve 4 of the water inlet is closed, the high pressure gas valve 5 is opened, and compressed air is introduced to the reactor 2 through the high-pressure air compression unit 8. When the air introduced to the reactor 2 reaches a designed amount, the high pressure gas valve 5 is closed, and the electromagnetic heating units provided in the front piston 10 and the rear piston 11 of the reactor is opened to heat the liquid to be treated and the gas in the reactor 2 so as to achieve a supercritical reaction state.

Step 3, when the reaction is completed, the electromagnetic control valve 6 of the water/gas outlet is opened so that reaction products enter the pressure reducing buffer unit through the water/gas outlet pipe 14. When the pressure in the reactor 2 drops to the standard atmospheric pressure, the push rod 12 of the rear piston of the reactor is driven by the driving motor 26 of the rear piston of the reactor, so that the rear piston 11 of the reactor is pushed to the residue outlet 13 until it is moved to the right side of the residue outlet 13, while hydraulic oil is introduced to the pressure vessel through the hydraulic control system 9, so that the front piston 10 of the reactor is pushed to the residue outlet 13 until it is moved to the left side of the residue outlet 13, so as to discharge solid residues out of the reactor 2. When the residue discharge is completed, the front piston 10 and the rear piston 11 of the reactor are reset through the joint action of the driving motor 26 of the rear piston of the reactor and the hydraulic control system 9.

Step 4, high temperature and high pressure gas/liquid pushes the piston 16 of the pressure reducing buffer unit downward to the bottom and decompressed gases enter the high efficiency condensation and heat recovery system 20 through the water/gas outlet 20 of the pressure reducing buffer unit. After the condensation, water is discharged through the water outlet vent 21 of the condensation and heat recovery unit, while gases obtained by the reaction, such as carbon dioxide, are discharged through the condensation and heat recovery unit 22. During this process, the wastewater in the wastewater tank 23 to be treated which enters the tank through the water inlet vent 24 of the preheating unit is preheated by the heat of the high temperature gas through the integral unit 20. Preheated wastewater enters the water inlet pipe 15 through the water outlet vent 25 of the preheating unit for a next reaction.

The above are the preferred embodiments of the present invention and are not intended to limit the present invention. Those skilled in the art may make some modifications to the technical solutions of the foregoing functional components or make equivalent alternations to part of the technical features with reference to the detailed description of the present invention. Any modifications, equivalent alternations and improvements without departing from the spirit and scope of the present invention shall fall in the protection scope of the present invention.

What is claimed is:

1. A horizontal self-balancing supercritical reaction apparatus, comprising a pressure vessel, an air compression unit and at least one reactor provided in the pressure vessel;
   wherein a front piston and a rear piston are provided inside the reactor, two ends of the reactor are closed by the front piston of the reactor and the rear piston of the reactor, respectively; a pressure medium is filled between the front piston of the reactor and an inner wall of the pressure vessel; the rear piston of the reactor is connected with a rear piston driving motor through a rear piston push rod; a valve-controlled water inlet and a water/gas outlet are provided in the reactor, and a heating unit is provided inside the reactor;
   wherein the air compression unit communicates with the interior of the reactor.

2. The apparatus as described in claim 1, further comprising a pressure reducing buffer unit, wherein the pressure reducing buffer unit comprises a piston, a cylinder, a piston push rod and a piston control motor; the cylinder is provided with a water inlet of the pressure reducing buffer unit, a water outlet of the pressure reducing buffer unit and a control valve of the pressure reducing buffer unit; the water inlet of the pressure reducing buffer unit is connected to the water/gas outlet of the reactor, and the water outlet of the pressure reducing buffer unit is connected to a wastewater tank to be treated; and the piston control motor controls the piston push rod to push the piston to move and control the pressure in the cylinder.

3. The apparatus as described in claim 1, further comprising a condensation and heat recovery unit connected to or integrated with a preheating unit, the condensation and heat recovery unit is connected to the water/gas outlet of the reactor or the water outlet of the pressure reducing buffer unit, and the preheating unit is connected to the wastewater tank to be treated and the water inlet of the reactor.

4. The apparatus as described in claim 1, further comprising a hydraulic control system, wherein the hydraulic control system controls a reciprocating movement of the front piston of the reactor by adjusting the pressure medium in the pressure vessel; a residue outlet is provided in the reactor, and the residue outlet is located within a movement range of the rear piston of the reactor.

5. The apparatus as described in claim 1, wherein an electromagnetic heating unit is selected as the heating unit, wherein the electromagnetic heating unit is placed in the front piston and the rear piston of the reactor.

6. The apparatus as described in claim 1, wherein both a valve at the water/gas outlet of the reactor and a structure of a main body of the water/gas outlet pipe are made of ceramic.

7. The apparatus as described in claim 1, wherein a pressure temperature sensor is further provided in the reactor, wherein the pressure temperature sensor is a ceramic sealed pressure temperature sensor.

8. The apparatus as described in claim 1, wherein a main body of the reactor is made of ceramic, spraying-coating ceramic or ceramic-metal composite.

9. The apparatus as described in claim 1, wherein a layer for protection, fixation and heat insulation is provided over the reactor, wherein the layer for protection, fixation and heat insulation is made of rubber or aerosol.

10. The apparatus as described in claim 1, wherein the reactor is with a split unitary structure or a combined integral structure.

11. The apparatus as described in claim 2, by further comprising a condensation and heat recovery unit connected to or integrated with a preheating unit, the condensation and heat recovery unit is connected to the water/gas outlet of the reactor or the water outlet of the pressure reducing buffer unit, and the preheating unit is connected to the wastewater tank to be treated and the water inlet of the reactor.

* * * * *

UNITED STATES PATENT AND TRADEMARK OFFICE
CERTIFICATE OF CORRECTION

PATENT NO. : 11,136,252 B2
APPLICATION NO. : 16/469824
DATED : October 5, 2021
INVENTOR(S) : Dandan Wu and You Han It is certified that error appears in the above-identified patent and that said Letters Patent is hereby corrected as shown below:

On the Title Page

Item (12) delete:
"Wu"
And insert:
--Wu et al.--

Item (72) Inventors should read:
Dandan WU
Nanjing, Jiangsu Province, P. R. China
You HAN
Tianjin City, P. R. China Signed and Sealed this
Twenty-eighth Day of May, 2024

Katherine Kelly Vidal
*Director of the United States Patent and Trademark Office*